(12) United States Patent
Al Shawaf

(10) Patent No.: US 11,623,514 B2
(45) Date of Patent: Apr. 11, 2023

(54) CONTROL DEVICE, TRANSPORT APPARATUS, AND METHOD

(71) Applicant: Rassmal Investments LLC, Dubai (AE)

(72) Inventor: Nasser Abdulmoeen Al Shawaf, Riyadh (SA)

(73) Assignee: Rassmal Investments LLC, Dubai (AE)

( * ) Notice: Subject to any disclaimer, the term of this patent is extended or adjusted under 35 U.S.C. 154(b) by 383 days.

(21) Appl. No.: 16/754,613

(22) PCT Filed: Oct. 9, 2018

(86) PCT No.: PCT/IB2018/057815
§ 371 (c)(1),
(2) Date: Apr. 8, 2020

(87) PCT Pub. No.: WO2019/073383
PCT Pub. Date: Apr. 18, 2019

(65) Prior Publication Data
US 2020/0282830 A1    Sep. 10, 2020

(30) Foreign Application Priority Data
Oct. 9, 2017 (NL) ................... 2019691

(51) Int. Cl.
*B60K 26/02* (2006.01)
*A63B 21/00* (2006.01)
(Continued)

(52) U.S. Cl.
CPC ............ *B60K 26/02* (2013.01); *A63B 21/225* (2013.01); *A63B 21/4034* (2015.10);
(Continued)

(58) Field of Classification Search
CPC ....... B60K 26/02; B60W 10/06; B60W 10/18; F02D 29/02
See application file for complete search history.

(56) References Cited

U.S. PATENT DOCUMENTS

| | | | |
|---|---|---|---|
| 3,513,928 A | 5/1970 | Emmons | |
| 4,171,029 A * | 10/1979 | Beale | ............ F02D 29/02 180/54.1 |
| 9,302,148 B1 | 4/2016 | Vujicic et al. | |
| 9,505,310 B2 | 11/2016 | Kronfeld et al. | |

(Continued)

FOREIGN PATENT DOCUMENTS

| | | |
|---|---|---|
| CN | 2210688 Y | 10/1995 |
| CN | 101534019 A | 9/2009 |

(Continued)

OTHER PUBLICATIONS

Nov. 12, 2018, International Search Report and Written Opinion, PCT/IB2018/057815.

*Primary Examiner* — Edwin A Young
(74) *Attorney, Agent, or Firm* — Banner & Witcoff, Ltd.

(57) ABSTRACT

The invention relates to a control device for controlling an engine driven transport apparatus. The control device comprises a fitness apparatus having a base part and at least one movable part movable with respect to the base part for enabling a user to perform a physical exercise. The control device further comprises a sensor device for sensing a degree of physical exercise. The control device is arranged for controlling engine power of an engine of the transport apparatus at least partly based on the sensed degree of physical exercise. The fitness apparatus comprises a flywheel rotatably connected to the base part. The fitness apparatus is arranged for setting the flywheel into motion by means of at least one of the one or multiple movable parts. The sensor device is arranged to sense the degree of performed physical exercise at least partly by sensing a degree of motion of the flywheel.

26 Claims, 2 Drawing Sheets

(51) Int. Cl.
*A63B 21/22* (2006.01)
*A63B 22/06* (2006.01)
*A63B 24/00* (2006.01)
*B60W 10/06* (2006.01)
*B60W 10/18* (2012.01)
*B60W 30/18* (2012.01)
*F02D 29/02* (2006.01)
*F02D 35/00* (2006.01)

(52) U.S. Cl.
CPC ...... *A63B 22/0694* (2013.01); *A63B 24/0062* (2013.01); *A63B 24/0087* (2013.01); *B60W 10/06* (2013.01); *B60W 10/18* (2013.01); *B60W 30/18009* (2013.01); *F02D 29/02* (2013.01); *F02D 35/00* (2013.01); *A63B 2024/0093* (2013.01); *A63B 2208/0233* (2013.01); *B60K 2026/026* (2013.01); *B60Y 2400/162* (2013.01); *F02D 2200/60* (2013.01)

(56) References Cited

U.S. PATENT DOCUMENTS

| | | |
|---|---|---|
| 2003/0199362 A1 | 10/2003 | Chamberlin |
| 2009/0227429 A1 | 9/2009 | Baudhuin |
| 2012/0237911 A1 | 9/2012 | Watterson |
| 2014/0353055 A1 | 12/2014 | Kronfeld et al. |
| 2014/0372005 A1* | 12/2014 | Darnell ............... F02D 41/2422 701/70 |
| 2017/0320485 A1* | 11/2017 | Miller .................. F02D 35/027 |

FOREIGN PATENT DOCUMENTS

| | | |
|---|---|---|
| DE | 102007050552 B3 | 9/2008 |
| DE | 102010028645 A1 | 11/2011 |
| DE | 102013209854 A1 | 11/2014 |
| EP | 2353659 A1 | 8/2011 |
| JP | 2001314538 A | 11/2001 |
| JP | 2008007054 A | 1/2008 |
| JP | 2012214174 A | 11/2012 |
| WO | 03072387 A2 | 9/2003 |
| WO | 2016172103 A1 | 10/2016 |

* cited by examiner

CONTROL DEVICE, TRANSPORT APPARATUS, AND METHOD

CROSS-REFERENCE TO RELATED APPLICATIONS

This application is a U.S. National Stage application under 35 U.S.C. § 371 of International Application PCT/IB2018/057815 (published as WO 2019/073383 A1), filed Oct. 9, 2018, which claims the benefit of priority to Application NL 2019691, filed Oct. 9, 2017. Benefit of the filing date of these prior applications is hereby claimed. Each of these prior applications is hereby incorporated by reference in its entirety.

The invention relates to a control device for controlling an engine driven transport apparatus.

Engine driven transport apparatuses or so-called engine driven transport vehicles, such as land vehicles, in particular motor vehicles, more in particular cars, and such as vessels and aircrafts, are generally known, and are for instance used by a user to transport himself, one or more passengers and/or cargo. An engine driven transport apparatus or so-called engine powered transport apparatus is generally known to be controlled at least partly by means of a control device, e.g. a mechanism by which the power and/or speed of an engine is controlled. For example, motor vehicles are usually fitted with a gas pedal or a so-called accelerator to regulate the power or speed of its engine, and aircrafts are often provided with a thrust lever to control the power of for example a jet engine or a propeller motor. Engine powered vessels or so-called self-propelled vessels such as motor boats and motor ships can for instance be provided with a throttle lever for regulating the power of the engines.

Such engine powered transport apparatus have many advantages. For example, contrary to a transport apparatus lacking an engine for driving the transport apparatus, users of an engine powered transport apparatus can for instance commute to and from work, get groceries at the grocery store and the like, in a relatively convenient, relatively comfortable and/or relatively safe environment. However, a disadvantage of such engine powered transport apparatus may lie in that the physical fitness of the users can degrade due to such comfort.

It is an object of the present disclosure to provide an alternative engine powered transport apparatus or so-called engine driven transport apparatus. In particular, it can be an object of the present disclosure to provide an engine driven transport apparatus, wherein at least one of the disadvantages of the prior art engine driven transport apparatuses is counteracted. In embodiments, the present disclosure may aim to provide an engine driven transport apparatus, which may facilitate counteracting that the physical fitness of a user, in particular a driver, of said engine driven transport apparatus degrades.

Thereto, in a first embodiment, the present disclosure provides for a control device for controlling an engine driven transport apparatus, comprising a fitness apparatus having a base part and at least one movable part movable with respect to the base part for enabling a user to perform a physical exercise, wherein the control device further comprises a sensor device for sensing a degree of physical exercise, and wherein the control device is arranged for controlling engine power of an engine of the transport apparatus at least partly based on the sensed degree of physical exercise, wherein the fitness apparatus comprises a flywheel rotatably connected to the base part, wherein the fitness apparatus is arranged for setting the flywheel into motion by means of at least one of the one or multiple movable parts, and wherein the sensor device is arranged to sense the degree of performed physical exercise at least partly by sensing a degree of motion of the flywheel.

Further, the present disclosure provides for a transport apparatus comprising such control device, in particular wherein the fitness apparatus of said control device is located near a transport apparatus' operator seat of said transport apparatus.

Further, the present disclosure provides for a control device for controlling an engine driven transport apparatus, which is arranged such that, during use of the control device, the engine power of at least one engine of the transport apparatus is controlled at least partly based on a sensed degree of motion of a flywheel set into motion by an operator of the transport apparatus due to said operator performing a physical exercise on a fitness apparatus incorporated in said control device.

By providing the engine driven transport apparatus with a fitness apparatus, an operator, in particular a driver, of said transport apparatus can fitness while operating, in particular driving, said transport apparatus. By controlling the engine power, in particular the output power, of the engine or engines of the engine driven transport apparatus at least partly based on the sensed degree of physical exercise, said operator may for instance be given an incentive to endeavor to fitness relatively well, as a mediocre effort of the operator could otherwise result in a relatively slow ride. By arranging the sensor device to sense the degree of performed physical exercise at least partly by sensing a degree of motion of the flywheel, for example, undesired fluctuations in speed and/or acceleration or deceleration may be counteracted. In particular, it can for example be counteracted that the vehicle, or other transport apparatus, unintentionally slows down considerably when the operator of the transport apparatus stops exercising temporarily, for instance due to paying attention to a current traffic situation as a result of which the exercising falters.

In particular, the engine power may be controlled by controlling a throttle valve such as to decrease or increase the restriction of a fuel flow, and/or an air flow and/or the like, fed to the engine of the engine powered transport apparatus. Contrary to conventional cars or other conventional transport apparatuses, the such throttle valve or other regulator may be controlled at least partly based on the degree of physical exercise performed in stead of being controlled at least partly based on the position of a gas pedal or a thrust lever or the like. Since the sensed degree of physical exercise may thus correspond with the position of a throttle valve, the present control device including the fitness apparatus may thus control the engine of the engine driven transport apparatus in a manner similar to how a gas pedal or so-called accelerator pedal controls the position of a throttle valve, and thereby controls the power output of the engine of for instance a car. It is noted that the present control device for controlling an engine driven transport apparatus may thus more or less replace one or more traditional control devices, such as a gas pedal, or a gas pedal and a brake pedal.

For example, the present control device may be arranged to provide an electric signal to control an electric motor, in particular a so-called electric or electronic throttle body (ETB) that controls the position of a throttle valve via a powertrain or engine control module (PCM or ECM). The present control device may thus form or be part of an alternative electronic throttle control that replaces an electronic throttle control (ETC) including an accelerator pedal.

By providing the fitness apparatus with the flywheel rotatably connected to the base part, wherein the fitness apparatus is arranged for setting the flywheel into motion by means of at least one on the one or multiple movable parts, in particular by means of the drive train connecting said flywheel with at least one of the one or multiple movable parts which form one or multiple input parts engageable by the user of the fitness apparatus in order to perform the physical exercise, the input provided by the operator can be kept relatively stable, which for instance may result in a relatively constant speed and/or relatively constant acceleration or deceleration.

Additionally or alternatively, the control device may be arranged such that, during use of said control device, the sensor device senses the degree of physical exercise substantially continuously or intermittently. Hence, the control device may for example control the engine power of the engine at least partly on the basis of a mean sensed degree of physical exercise, in particular a mean sensed degree determined on the basis of a multiplicity of consecutive sensed degrees of physical exercise. This may facilitate that undesired fluctuations in speed and/or acceleration or deceleration can be counteracted, which for instance may have a positive effect on fuel consumption.

In embodiments, the control device can be arranged to adjust the extent to which fluctuations in the degree of physical exercise can be compensated by controlling the engine power based on a mean sensed degree of physical exercise. The sensitivity of the engine power can thus be adjusted, which means that the engine power can be more sensitive to changes or fluctuations in the degree of physical exercise, for instance to temporarily set the transport device in a sport-modus or the like, and can be less sensitive at other moments, for instance when cruising on a motorway or the like.

Advantageously, the control device may be arranged such as to enable adjustment of a ratio between the degree of physical exercise and the engine power of an engine of the transport apparatus. This may for instance facilitate that one can drive a car at a relatively high speed for a relatively long time without having to exercise at a relative high pace during said relatively long time.

Additionally or alternatively, the control device may be arranged such as to enable adjustment of the resistance characteristics of the fitness apparatus, in particular the resistance characteristics of at least one of the movable parts of said fitness apparatus. This may for instance facilitate that one can exercise relatively hard, without driving relatively fast and/or accelerating relatively swiftly.

Further, the present disclosure relates to a method for controlling an engine driven transport apparatus.

Preferred embodiments according to the present disclosure are set out in the below clauses:

1. Control device for controlling an engine driven transport apparatus, comprising a fitness apparatus having a base part and at least one movable part movable with respect to the base part for enabling a user to perform a physical exercise, wherein the control device further comprises a sensor device for sensing a degree of physical exercise, and wherein the control device is arranged for controlling engine power of an engine of the transport apparatus at least partly based on the sensed degree of physical exercise.

2. Control device according to clause 1, wherein the sensor device is arranged to sense the degree of physical exercise at least partly by sensing:
   a rate of movement of at least one of the one or multiple movable parts of the fitness apparatus; and/or
   a force exerted on at least one of the one or multiple movable parts.

3. Control device according to any one of the preceding clauses, wherein the base part of the fitness apparatus is arranged for attachment to a frame of the transport apparatus.

4. Control device according to any one of the preceding clauses, wherein the fitness apparatus comprises pedals, preferably foot pedals, that are rotatably connected to the base part, and wherein at least one of said pedals forms at least one of the one or multiple movable parts of the fitness apparatus.

5. Control device according to clause 4, wherein the control device is arranged for sensing directly or indirectly whether the pedals are rotated in a direction opposite to a direction in which the pedals are rotated during the physical exercise, and wherein the control device is further arranged for controlling one or multiple brakes of the transport apparatus when is sensed that the pedals are rotated in said opposite rotation direction.

6. Control device according to any one of the preceding clauses, wherein the fitness apparatus comprises a flywheel rotatably connected to the base part, wherein the fitness apparatus is arranged for setting the flywheel into motion by means of at least one of the one or multiple movable parts, in particular by means of a drive train connecting said flywheel with at least one of the one or multiple movable parts which form one or multiple input parts engageable by the user of the fitness apparatus in order to perform the physical exercise.

7. Control device according to clause 6, wherein the sensor device is arranged to sense the degree of performed physical exercise at least partly by sensing a degree of motion of the flywheel.

8. Control device according to any one of the preceding clauses, wherein the fitness apparatus is at least partly covered by a housing.

9. Control device according to clause 8 and one of clauses 6 and 7, wherein the housing at least covers the flywheel, and preferably covers the drive train as well.

10. Control device according to any one of the preceding clauses, wherein, during use of the control device, the sensor device senses the degree of physical exercise substantially continuously or intermittently, and wherein the control device is arranged to control the engine power of the engine at least partly on the basis of a mean sensed degree of physical exercise determined on the basis of a multiplicity of consecutive sensed degrees of physical exercise.

11. Control device according to any of the preceding clauses, wherein the fitness apparatus is arranged for adjusting the resistance characteristics of the fitness apparatus, in particular the resistance characteristics of at least one of the movable parts of said fitness apparatus.

12. Control device according to clause 11, further comprising a computer device configured for storing data regarding at least one and preferably multiple different fitness programs that each include one or more sets of predefined different resistance characteristic values, in particular as a function of time, wherein the control device is arranged for allowing the user to select one of said fitness programs and for executing said respective selected fitness program by controlling the fitness apparatus.

13. Control device according to clause 12, wherein the control device is arranged to allow the computer device to connect to a database in order to download data regarding a fitness program onto said computer device and/or in order to upload data to said database.

14. Control device according to any one of the preceding clauses, wherein the control device is arranged for adjusting a ratio between the degree of physical exercise and the engine power of an engine of the transport apparatus.

15. Transport apparatus, comprising a control device according to any one of the preceding clauses.

16. Transport apparatus according to clause 15, wherein the fitness apparatus is located near a transport apparatus' operator seat of said transport apparatus, in particular such that the operator, while operating said transport apparatus, can perform a physical exercise on said fitness apparatus, thereby controlling the engine power of the engine of said transport apparatus at least partly by means of said physical exercise.

17. A method for controlling an engine driven transport apparatus, comprising the steps of:
  powering or so-called driving the transport apparatus merely by means of one or multiple engines of said transport apparatus; and
  controlling engine power of said one or multiple engines of the engine driven transport apparatus at least partly based on a sensed degree of physical exercise performed by an operator of said transport apparatus.

18. Method according to clause 17, wherein the physical exercise performed by the operator is performed on a fitness apparatus provided in said transport apparatus.

Advantageous embodiments according to the present disclosure are described in the appended claims.

In order to further elucidate the present disclosure, embodiments thereof shall be disclosed and discussed hereafter, with reference to the drawings in which.

In this description embodiments are shown and described of the present disclosure, by way of example only. These should by no means be interpreted or understood as limiting the scope of the present invention in any way. In this description the same or similar elements are indicated by the same or similar reference signs.

Figure 1:
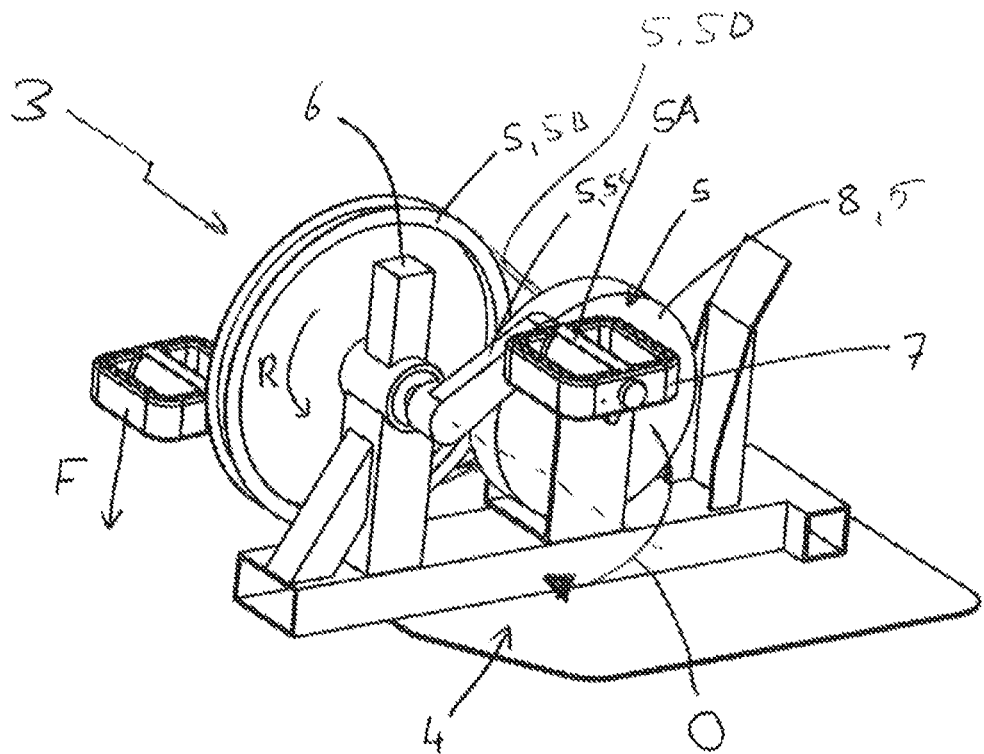
FIG. 1 shows a schematic partly cut-away perspective view of an embodiment of a control device according to a first aspect of the present disclosure.
Figure 2:
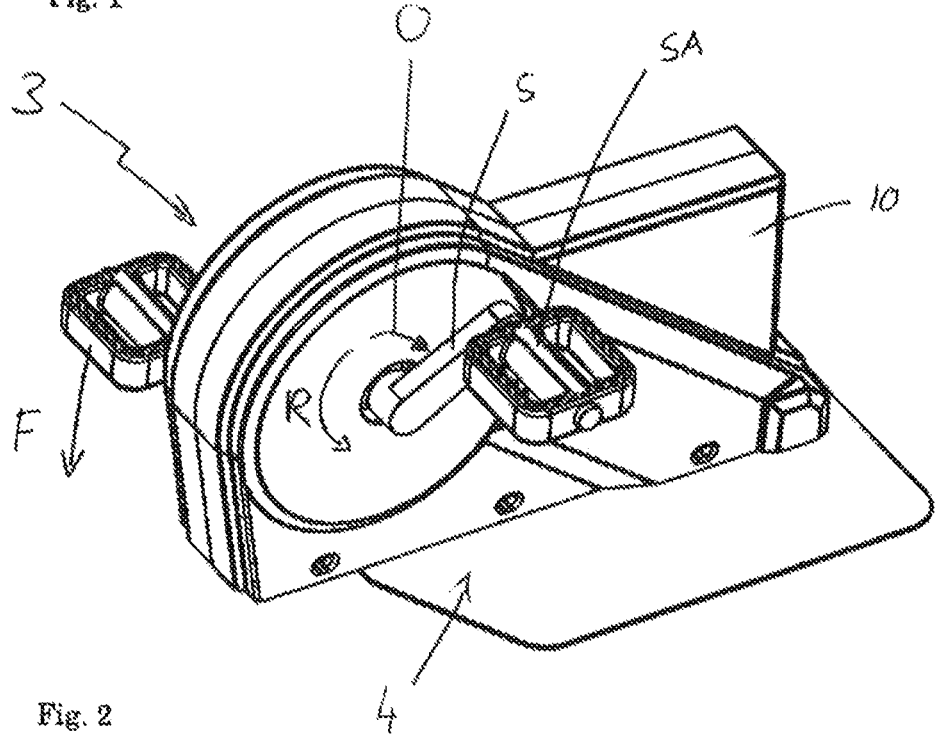
FIG. 2 shows a schematic perspective view of the control device of FIG. 1 including a housing.
Figure 3:
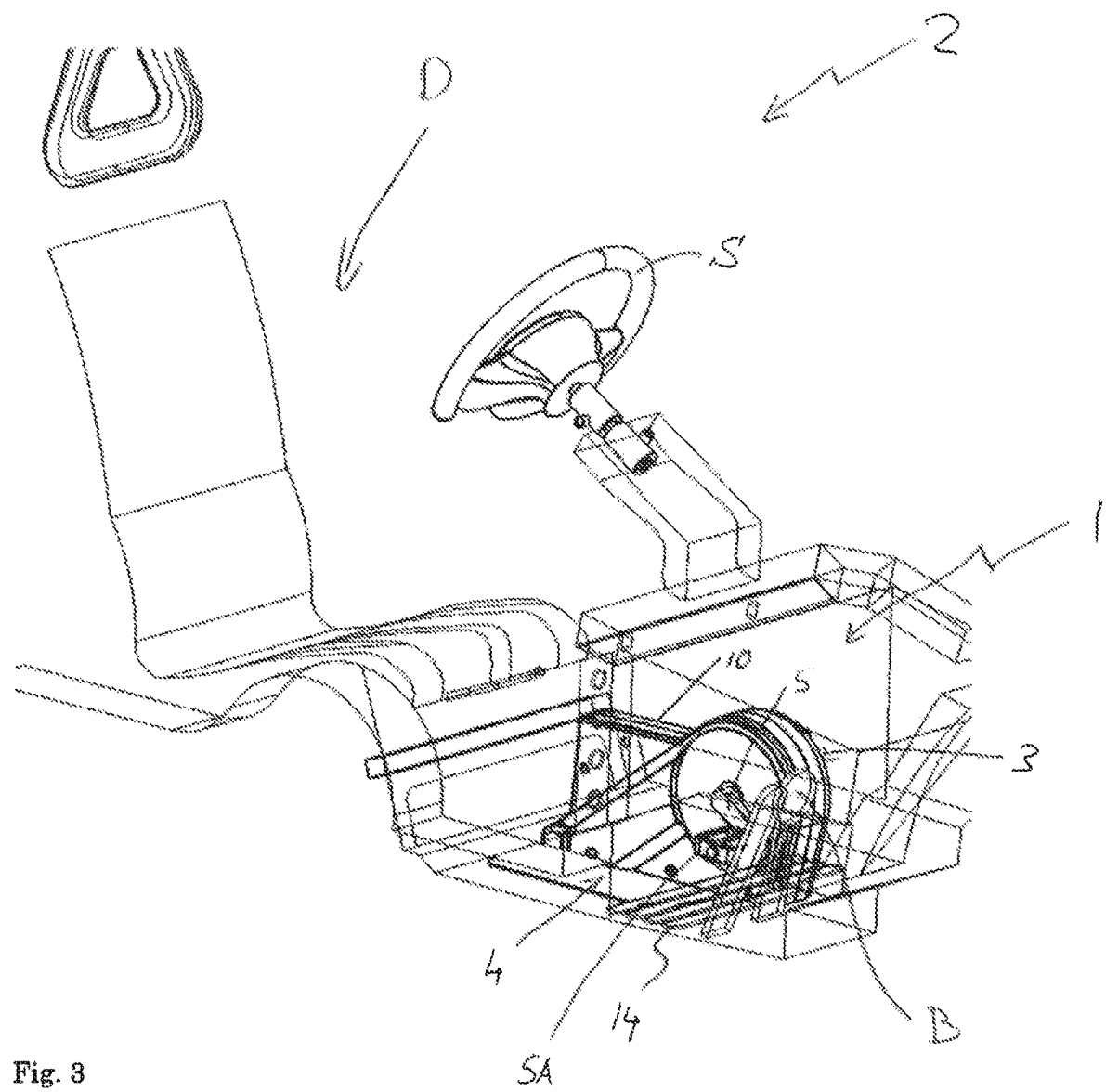
FIG. 3 shows a schematic partly cut-away perspective view of a transport apparatus provided with the control device of FIG. 2 placed in front of a driver's seat of said transport apparatus.

FIG. 1 and FIG. 2 schematically show an embodiment of a control device 1 for controlling an engine of an engine driven transport apparatus 2, and FIG. 3 shows a schematic perspective view of a partial cut-out of an engine driven transport apparatus 2 provided with such control device 1.

The engine to be controlled by the control device 1 can be understood as the engine or one of the engines which is for driving the transport apparatus 2, powering the transport apparatus 2, propelling the transport apparatus 2, etc. The engine can be, but is not limited to, a combustion engine, a steam engine, an electric engine, a jet engine, etc.

The engine driven transport apparatus 2 can be understood as a transport apparatus that can be driven or moved by means of one or more engines. In particular, at least during use, the engine driven transport apparatus 2 or so-called engine powered transport apparatus 2 may thus be powered or driven by one or more engines, and may then not be human powered and may then not be animal powered either. The engine driven transport apparatus or vehicle 2 can thus be powered substantially merely by means of one or more engines during use. The engine driven transport apparatus 2 can for example be an engine powered land vehicle, a self-propelled vessel, a powered aircraft, or the like. Preferably, the transport apparatus can be an engine driven land vehicle such as a self-propelled vehicle or so-called motor vehicle, for example a car or a bus. However, other types of engine driven transport apparatuses may be possible, such as a railed vehicle, in particular a train or a tram, or such as a motorbike, etc. The transport apparatus can have a body for accommodating an operator of said transport apparatus, and/or for accommodating one or more passengers.

The transport apparatus 2 can be operated by an operator, which can operate the control device 1 in order to control the engine driven transport apparatus 2, in particular in order to control the engine power of the engine of said transport apparatus 2. In this description, the operator can be understood as an operator of the transport apparatus, who preferably can at least partly control the speed and/or direction of said transport apparatus 2. For example, in the case the transport apparatus 2 is a car or other motor vehicle, the operator may be a driver of said car or other motor vehicle. Alternatively, for instance in case of an aircraft, the operator may be a pilot, or, for instance in case of a vessel, the operator may be a helmsman.

The control device 1 comprises a fitness apparatus 3 or so-called exercise apparatus 3. Said fitness apparatus has a base part 4 and at least one movable part 5 movable with respect to the base part 4 for enabling a user to perform a physical exercise, in particular by moving said movable part 5 with respect to the base part 4. During use, the user of the fitness apparatus 3 may substantially continuously move said movable part 5 during a certain time interval, and may for instance substantially continuously move said movable part 5 during one or multiple minutes, for instance during at least 1 minute, at least 5 minutes, at least 10 minutes, or at least 30 minutes or even more.

The control device 1 comprises a sensor device 6 for sensing a degree of physical exercise. The control device 1 is arranged for controlling the engine power of at least one engine of a transport apparatus at least partly based on the sensed degree of physical exercise. Based on the degree of physical exercise performed by a user of the fitness apparatus, the power delivered by the engine of the engine powered transport apparatus 2 can be controlled, at least partly, and preferably to a large extent. Basically, the control device 1 can form an alternative to a conventional control for controlling the engine power of a transport apparatus. For example, the control device 1 can be used as an alternative to a gas pedal, for instance in a car or other motor vehicle, or as an alternative to a thrust lever or power lever or engine control lever in an aircraft or a boat or other vessel. According to an aspect of the present disclosure, instead of controlling the engine based on a position of the gas pedal or respective lever for controlling engine power, the engine power of the engine powered transport apparatus 2 can thus at least partly be based on the degree of physical exercise, which can be sensed by the sensor device 6.

As can be seen in FIG. 3, which shows a partly cut-away perspective view of a transport apparatus 2, in particular a motor vehicle, comprising the control device 1 comprising a fitness apparatus 3, said fitness apparatus 3 can be located near a transport apparatus' operator seat D, such as a driver seat, a pilot seat, a helmsman seat, a captain seat or a skipper seat. In particular, the fitness apparatus 3 can be placed in front of the operator seat D. In such a way, an operator of the transport apparatus 2 can perform a physical exercise on said fitness apparatus 3, in order to control the engine power of said transport apparatus 2, while being able to control other operating controls, such as operating controls for controlling the direction of said transport apparatus 2, in particular operating controls such as steering wheel S, a helm, a yoke or the like. It will be appreciated that other operating controls, such as for instance brake controls B and/or a direction indicator lever and/or pedals for controlling a rudder of an airplane, may also be operable by an operated exercising on the fitness apparatus 3 and/or sitting on the operator seat D.

In embodiments, such as in the here shown embodiment, the fitness apparatus 3 can be formed more or less as a stationary bicycle or so-called exercise bike, wherein at least one of the one or multiple movable parts 5 comprises or is formed by an input part 5A, which is a part 5A which can be engaged by a user and be set into motion. The input parts 5A shown in FIGS. 1-3 comprise pedals 7, in particular foot pedals 7. The user can perform a physical exercise by moving the pedals 7. In alternative embodiments, the fitness apparatus 3 can be of another design, and may for instance be substantially formed as:

- a treadmill, especially wherein at least one input part 5A can comprise or may be formed by a surface such as a conveyor, that can be engaged and can be moved by a user in a substantially planar direction;
- a stair mill, especially wherein at least one input part 5A can comprise or may be formed by a pedal, in particular a pedal that can be moved by a user in a substantially upward and downward direction;
- a rowing machine, especially wherein at least one input part 5A can comprise or may be formed by a handle, which can be moved by a user with a pulling and releasing motion; and/or
- an elliptical machine, wherein at least one input part 5A can comprise or may be formed by a pedal 7, which pedal or pedals 7 can be moved by a user along a substantially elliptical path.

However, other designs can be possible, for example, the fitness apparatus 3 may comprise one or more input parts 5A, for example formed by one or more pedals 7, and may be arranged such as to allow a user to move said input parts 5A in a substantially planar direction, in particular, especially in case of two pedals, in an opposite planar direction.

The sensor device 6 can be for sensing the current or present degree or extent of physical exercise performed by the user on the fitness apparatus 3.

In embodiments, the sensor device 6 can be arranged to sense the degree of physical exercise performed on the fitness apparatus 3 by a user at least partly by sensing a rate of movement, such as a speed or an acceleration, preferably the revolutions per minute, of at least one of the one or multiple movable parts 5 of the fitness apparatus 3. In embodiments, a measurement of the rate of movement can for example be achieved by a tachometer to measure the rotation speed of a shaft or disk, a so-called Hall effect sensor that measures an output voltage in response to a magnetic field or a Reed relay sensor that measures an applied magnetic field by operating an electrical switch. Additionally or alternatively, the sensor device 6 can be arranged to sense said degree of physical exercise at least partly by sensing a force F exerted on at least one of the one or multiple movable parts 5, preferably input parts 5A, of the fitness apparatus 3 as shown in FIGS. 1 and 2. The force F exerted on a movable part 5, preferably an input part 5A, can be a measure of a user's pushing force or pulling force. The force F can for example be measured by a strain gauge, which can be placed on one or multiple of said movable parts 5. Additionally or alternatively, the sensor device 6 can be arranged to sense said degree of physical exercise at least partly by sensing work done by friction, as a result of moving at least one of the one or multiple movable parts 5 with respect to the base part 4, in the form of heat.

As shown in FIGS. 1, 2 and 3, the input part 5A can comprise or can be formed by a pedal 7. Additionally or alternatively, the input part can comprise or be formed by a handle, such as a handlebar or hand grip and/or a surface, such as a conveyor or plateau.

In embodiments, the fitness apparatus 3 can comprise pedals 7, preferably foot pedals, wherein at least one of the said pedals 7 forms at least one of the one or multiple movable parts 5 of the fitness apparatus 3. Preferably, the pedals 7 form at least one of the input parts 5A to be put into motion by a user in order to perform physical exercise on said fitness apparatus 3. The pedals 7 can be rotatably connected to the base part 4, such that a user can perform physical exercise by rotating the pedals with respect to the base part 4. The base part 4, which may be formed by a frame 4 or the like, may be fixedly attached to the transport apparatus 2, or may be part of said transport apparatus 2. In embodiments, the base part 4 of the fitness apparatus 3 can be arranged for attachment, for instance detachable attachment, to the transport apparatus 2, wherein the base part 4 can be detachably attached to the transport apparatus 2 using attachment means 14. In this manner, at least during use, the fitness apparatus 3 can be fixedly connected to the transport apparatus 2. Additionally or alternatively, the control device 1 forms part of or can be attached to the transport apparatus 2.

In the here shown embodiment, the control device 1 comprises a flywheel 8 that is rotatably connected to the base part 4. The fitness apparatus 3 can be arranged for setting the flywheel 8 into motion by means of at least one of the one or multiple movable parts 5. In particular, the flywheel 8 can be set into motion by means of a drive train 9, which connects said flywheel 8 with at least one of the one or multiple movable parts 5, preferably the input part 5A which can be put into motion by a user. Alternatively, the flywheel 8 can be set into motion directly, for example by providing input parts 5A, in particular pedals 7, on the flywheel 8. In embodiments, for instance when the pedals 7 or other input parts 5A are provided on the flywheel 8, a freewheel device or so-called overrunning clutch or so-called one way clutch may be provided. The input parts 5A, for instance foot pedals 5A, 7, may for instance be directly connected to the flywheel 8 by means of such one way clutch. In case the input part or parts 5A are indirectly connected to the flywheel 8 by means of a drive train 9, the drive train 9 can comprise the one way clutch at any suitable position, for instance on an axis about which the flywheel 8 can rotate or on an axis on which the pedals 7 or other input parts 5A are provided. As a result of the one way clutch, the pedals 5A, 7, or other input part or parts 5A, can be held still, such that the operator of the transport apparatus 2 can for instance hold still his or her limbs that engage the input parts 5A while the flywheel keeps spinning.

For example, as in the shown embodiment, pedals 5A that form the input parts 5A can be connected to a sprocket or a pulley 5B, for instance a sprocket or pulley in which a one way clutch or so-called freewheel is incorporated, by means of cranks 5C. The drive train 9 can then further comprise a belt 5D, a chain or the like to drive a further pulley or sprocket, which in turn may be operatively connected to the flywheel 8, directly or indirectly. However, all kinds of other suitable drive train designs may be possible, which will be understood by the person skilled in the art.

In embodiments of the present disclosure, the sensor device 6 can be arranged to sense the degree of performed exercise by a user on the fitness apparatus 3 at least partly by sensing a degree of motion, speed and/or acceleration of the flywheel 8. This may facilitate that the control device 1 can be used to control the engine power of the engine of the transport apparatus 2 at least partly based on the sensed degree of motion, speed and/or acceleration of the flywheel 8. An advantage of using the flywheel 8, which can efficiently store rotational energy, may lie in that when a user stops performing physical exercise on the fitness apparatus 3, the degree of motion of the flywheel 8 can at least temporarily be used as input for the sensor device 6 such that the control device 1 can control the engine power of an engine powered transport apparatus at least partly based on said degree of motion of the flywheel 8. In this manner, the engine power of the transport apparatus 2, and therefore its speed, may remain relatively constant, at least relatively constant with respect to the extent of physical exercise, which may be less constant, for example due to a user taking a break from performing physical exercise on the fitness apparatus, for instance to concentrate on a traffic situation. Hence, it may for instance be counteracted that the transport apparatus 2 undesirably decelerates relatively abruptly when a user of the fitness apparatus 3, i.e. an operator of said transport apparatus 2, stops or abates the extent of his physical exercise momentarily.

The transport apparatus 2, or other vehicle, may comprise one or more brakes, which may be controlled by means of one or more brake controls B, which for instance may be formed by at least one of the at least one or multiple moving parts 5, but which, alternatively or additionally, may be formed by one or more other parts, such as for instance a conventional brake pedal B. For example, the one or more brake controls B may be part of the control device 1.

It will be appreciated that the engine powered transport apparatus 2, in particular its control device 1, may be arranged such that the engine will stop powering the transport apparatus 2 during braking.

Besides, it will be appreciated that the transport apparatus 2, in particular its control device 1, may be arranged such that the flywheel 8 is slowed down when the transport apparatus 2 is slowed down by braking. When a user is braking, the flywheel 8 will then thus be slowed down, as a result of which the sensor device 6 arranged to sense the degree of performed exercise by the user on the fitness apparatus 3 at least partly by sensing the degree of motion, such as the speed and/or the acceleration—which latter may be a negative acceleration or so-called deceleration—of the flywheel 8, can, once the braking action is over, for instance sense a relatively low speed and/or a deceleration of the flywheel 8. It will be appreciated that by braking the flywheel 8 while braking the transport apparatus 2, it may for instance be counteracted that the engine power, in particular the output power, will be relatively high just after such braking action, thereby thus counteracting that the transport apparatus 2 may unintentionally be accelerated to a relatively high speed due to a still relatively rapidly spinning flywheel 8 while the operator of the transport apparatus 2 did not, or not yet, return to an intensity of physical exercise corresponding with such relatively high speed.

In embodiments, the control device 1, in particular its fitness apparatus 3, can comprise a housing 10 at least partly covering said fitness apparatus 3. Preferably, the housing 10 covers at least some of the movable parts 5 of the fitness apparatus 3. The housing 10 can for instance at least cover the flywheel 8, if present, and can preferably cover at least the drive train 9, if present, such that a user can be protected from at least some of said moving parts 5. Additionally or alternatively, by providing the housing 10, at least some of the covered moving parts 5, can be at least partly protected from dust and contamination from outside.

It is noted that the sensor device 6 can, during use of the control device 1, sense the degree of physical exercise substantially continuously or intermittently. The control device 1 may then be arranged for controlling the engine power of the engine of the transport apparatus 2 at least partly on the basis of a mean sensed degree of physical exercise. Said mean sensed degree of physical exercise can be determined on the basis of a multiplicity of consecutive sensed degrees of physical exercise. In this way a relatively stable speed can be achieved over a period of time, as the degree of sensed physical exercise used as input for the control device 1 can be averaged out, at least to some extent.

Additionally or alternatively, the control device 1 can be arranged to adjust the extent to which fluctuations in the degree of physical exercise can be compensated by controlling the engine power based on a mean sensed degree of physical exercise. The sensitivity of the engine power can thus be adjusted. Hence, the rate to which the engine reacts on fluctuations in the degree of physical exercise can be adjusted, for instance to temporarily set the transport device 2 in a sport-modus or the like.

In embodiments, for instance such as the one shown in FIGS. 1 and 2 and/or for instance when the fitness apparatus 3 is substantially formed as a stationary bicycle or so-called exercise bike, the control device 1 can be arranged such that a respective movable part 5 can be moved in a first direction R, e.g. a first rotational direction R, during exercise. Additionally, control device's fitness apparatus 3 may be arranged to allow that said movable part 5 may be moved in an other direction as well, in particular a direction O opposite to said first direction. For example, the control device 1 may be arranged such that the input parts 5A, in particular input parts formed as pedals 7, can be rotated in a first direction R during the physical exercise. As will be appreciated by the skilled person, the control device 1 can thus be arranged for sensing whether the input parts 5A are rotated in said direction R and at which speed, for instance by directly of indirectly sensing the speed of movement of one of the movable parts 5 of the fitness apparatus 3, in particular by directly of indirectly sensing the rotational movement of input parts 5A formed by pedals, by directly or indirectly sensing the rotational speed of a flywheel 8, if any, and/or by directly or indirectly sensing the speed of an other movable part 5, for instance an other movable part 5 formed by a drive train 9 interconnecting the input part(s) 5A with a flywheel 8. The control device 1 can be arranged for sensing whether the respective movable part(s) 5, that can be moved in the first direction as well as in a second direction, are moved in said second direction. In particular, the control device 1 can be arranged for sensing, directly or indirectly, whether the one or multiple input parts 5A, especially input parts 5A formed as the two pedals 7, are moved in said second direction, especially whether they are rotated in a rotational direction opposite to said first direction R. In this manner, the control device 1 can for example be arranged for controlling one or multiple brakes of the transport apparatus 2 at least partly based on a sensed degree of motion of the movable part(s) 5, in particular a motion O opposite to the first or use direction R in which the input part(s) 5A and/or other movable part(s) 5, 8 moves during normal use of the fitness apparatus 3, e.g. during driving a car provided with the control device 1 including said fitness apparatus 3.

Although the control device 1 can thus be arranged to sense an opposite rotational direction O in order to enable braking of the transport apparatus 2, in alternative embodiments, the control device 1 can for example be arranged for sensing whether the input part(s) 5A, and/or one or more other movable parts 5, are moved in a direction that differs from the normal direction in which it moves during exercise, for instance for sensing whether such different movement is in a direction transverse to the direction in which it is moved as a result of the physical exercise being performed. For example, a rowing machine forming the fitness apparatus 3 of the control device 1 may have an input part 5A comprising or formed by handles, for instance comprised at a handlebar. A user can perform physical exercise on the rowing machine by moving the handles in a substantially forward and backward motion. Movement of the handles and/or handlebar in a different direction, for example by pulling the handles apart in opposite outward directions, transverse to the forward and backward motion, may be allowable and sensible, such that the control device 1 can control one or multiple brakes of the transport apparatus 2 at least partly based on a sensed degree of motion different to the normal physical exercise motion, in particular substantially transverse with respect to the motion of physical exercise.

It is noted that although a predefined movement of one or more of the movable parts 5 of the fitness device 3 can be used to determine that one or more brakes of the transport apparatus 2 have to be activated, the transport apparatus 2 may additionally or alternatively be provided with one or more alternative brake controls B, such as for instance a relatively conventional brake pedal B.

As shown in FIG. 3, in embodiments, the control device 1 can be placed in or form part of a transport apparatus 2. In embodiments, such as in the here shown embodiment, the control device 1, at least its fitness apparatus 3, or at least its movable input parts 5A, can be placed or positioned in a transport apparatus 2, in particular a motor vehicle, such as a car, nearby or in the vicinity of an operator's seat D, in particular a driver's seat D, such that an operator of said transport apparatus 2 can exercise on the fitness apparatus while operating one or more other controls of the transport apparatus. Although the engine driven transport apparatus may preferably include an operator's seat, the operator may in alternative embodiments be located outside the engine driven transport apparatus during use of said apparatus. For instance in case the engine driven transport apparatus forms a drone, for example a drone transporting an embedded camera.

For instance in order to enhance the strength or conditioning effects of the physical exercise, the user performing said physical exercise on the fitness apparatus 3 may experience a certain resistance, in particular at least partly as a result of inherent frictional losses between the one or multiple movable parts 5 of said fitness apparatus 3. Advantageously, the resistance a user experiences during a physical exercise session or a fitness session, may be variable by arranging the control device 1 such as to enable adjusting the resistance characteristics of the fitness apparatus 3. The resistance characteristics can for instance be understood as frictional losses perceived by the user as a certain resistance. An increase in the resistance characteristics can lead to a higher intensity of a fitness session or a workout as a higher degree of physical exercise is needed to move the movable parts 5. In such a manner a user can adjust the resistance characteristics to a preferred resistance, which can influence the intensity of a workout for the user, and/or can enhance the experience or outcome of an exercise routine.

In embodiments, the control device 1 can further comprise a computer device 11, which is configured for storing data regarding at least one and preferably multiple different fitness programs or workouts or exercise routines. Each fitness program or workout or exercise routine can include predefined different resistance characteristics values. In particular, the different resistance characteristics values can be as a function of time, for example substantially linearly changing, e.g. increasing, from a base value, or increasing or decreasing substantially as a step function, or increasing or decreasing substantially exponentially, or substantially increasing or decreasing parabolically, or as a substantially high intensity workout step function, or the like. In this way, a user can run through a predefined fitness program or exercise routine that might be geared towards for example endurance, cardio, burning calories, or the like. The control device 1 can be arranged for allowing the user to select one of said fitness programs and for executing said respective selected fitness program by controlling the fitness apparatus 3 such that said fitness apparatus 3 is adjusted to the resistance characteristic, which resistance characteristic can be changed according to the predefined resistance characteristic values of the selected fitness program.

Additionally or alternatively, the control device 1 can be arranged for adjusting a ratio between the degree of physical exercise sensed and the engine power of an engine of the transport apparatus 2. In this manner, the user can adjust the ratio for example from a relatively high ratio, in which a relatively low degree of physical exercise can relate to a relatively high engine power, to a relatively low ratio, in which a relatively high degree of physical exercise can relate to a relatively low engine power. In such a way, a user may select a relatively high ratio for example on a motor way, or for long distance commutes, and a relatively low ratio for example in rural areas where the speed limit is relatively low, and/or in case of a relatively short ride. This can be beneficial depending on the user when the transport apparatus 2 comprising the control device 1 is shared between multiple users. For example, when users with different levels of physical fitness share turns in the operation of the same transport apparatus 2. In such a manner, users with a relatively high level of physical fitness can choose a more challenging degree of physical exercise and users with a relatively low level of physical fitness can opt for a less intense workout or fitness session. It will be appreciated that more than two ratios, in particular one or more ratios between the relatively high and the relatively low ratio, can be made available to the user to choose from.

In embodiments, the control device 1 can further be arranged to allow the computer device 11 to connect to a database, in particular a database located on an external server. The connection to the database can for instance allow uploading and/or downloading of data regarding a fitness program onto said computer device 11. Said connection can for example be a wireless or a physical connection, such as for example through a cable. In this way, new fitness programs can be made accessible to users via a download and/or it can facilitate creating an interactive community and/or a platform for sharing a user's fitness program profile and updating a status thereon.

In embodiments of a transport apparatus 2 provided with the control device 1, a steering control S of said transport apparatus 2, which is located nearby or in the vicinity of an operator or a driver, can be arranged to facilitate the operator of said transport apparatus 2 to perform physical exercise on the fitness apparatus 3. For example, the shape of the steering control S, in particular a steering wheel S, and/or the location of said steering control S, can be arranged to counteract that for instance an operator his legs collide with said steering control S during performing the physical exercise on the fitness apparatus 3.

It is noted that for the purpose of clarity and a concise description features are described herein as part of the same or separate embodiments, however, it will be appreciated that the scope of the disclosure may include embodiments having combinations of all or some of the features described.

Further, it is noted that the invention is not restricted to the embodiments described herein. It will be understood that many variants are possible.

For example, the control device may be arranged such that it can be brought into an alternative use state in which the input parts, e.g. formed by pedals, of the fitness apparatus can be used more or less in line with the manner in which conventional controls for controlling the engine power of the transport apparatus, such as a gas pedal or thrust lever, are used. This is, in stead of controlling the engine power based on the degree of physical exercise, especially determined based on the speed movement of such input parts, the engine power can be based on a current position of a respective input part or other moving part. For example, rotating the pedals slightly forward may then increase the output power of the engine, whereas rotating the pedals slightly backward may decrease the output power of the engine.

As an other example, the control device may be arranged to be brought into a state in which it does not control the engine power, but in which a user may nevertheless use it to perform fitness activities. For example at moments when the transport apparatus is driving autonomously and/or is maintaining a substantially steady speed by means of a cruise control system, the control device may not control the engine power during driving said transport apparatus and the degree of physical exercise performed will then not affect the output power of the engine.

Alternatively or additionally, in embodiments, the control device may be arranged to generate electric energy.

Such and other variants will be apparent for the person skilled in the art and are considered to lie within the scope of the invention as formulated in the following claims.

The invention claimed is:

1. A control device for controlling an engine driven transport apparatus, comprising a fitness apparatus having a base part and at least one movable part movable with respect to the base part for enabling a user to perform a physical exercise, wherein the fitness apparatus comprises a flywheel rotatably connected to the base part, wherein the fitness apparatus is arranged for setting the flywheel into motion by at least one of the one or multiple movable parts, wherein the control device further comprises a sensor device for sensing a degree of physical exercise at least partly by sensing a degree of motion of the flywheel, and wherein the control device is arranged for controlling engine power of an engine of the transport apparatus at least partly based on the sensed degree of physical exercise at least partly sensed by sensing the degree of motion of the flywheel.

2. The control device according to claim 1, wherein the base part of the fitness apparatus is arranged for attachment to a frame of the transport apparatus.

3. The control device according to claim 1, wherein the fitness apparatus comprises pedals rotatably connected to the base part, and wherein at least one of said pedals forms at least one of the one or multiple movable parts of the fitness apparatus.

4. The control device according to claim 3, wherein the pedals are foot pedals.

5. The control device according to claim 3, wherein the control device is arranged for sensing directly or indirectly whether the pedals are rotated in a direction opposite to a direction in which the pedals are rotated during the physical exercise, and wherein the control device is further arranged for controlling one or multiple brakes of the transport apparatus when it is sensed that the pedals are rotated in said opposite rotation direction.

6. The control device according to claim 1, wherein the fitness apparatus is arranged for setting the flywheel into motion by a drive train connecting said flywheel with at least one of the one or multiple movable parts which form one or multiple input parts engageable by the user of the fitness apparatus in order to perform the physical exercise.

7. The control device according to claim 1, wherein the fitness apparatus is at least partly covered by a housing.

8. The control device according to claim 7, wherein the housing at least covers the flywheel.

9. The control device according to claim 8, wherein the fitness apparatus is arranged for setting the flywheel into motion by a drive train connecting said flywheel with at least one of the one or multiple movable parts which form one or multiple input parts engageable by the user of the fitness apparatus in order to perform the physical exercise, and wherein the housing covers the drive train as well.

10. The control device according to claim 1, wherein, during use of the control device, the sensor device senses the degree of physical exercise substantially continuously or intermittently, and wherein the control device is arranged to control the engine power of the engine at least partly on the basis of a mean sensed degree of physical exercise determined on the basis of a multiplicity of consecutive sensed degrees of physical exercise.

11. The control device according to claim 1, wherein the fitness apparatus is arranged for adjusting resistance characteristics of the fitness apparatus.

12. The control device according to claim 11, further comprising a computer device configured for storing data regarding at least one fitness program that includes one or more sets of predefined different resistance characteristic values, wherein the control device is arranged for allowing the user to select said fitness program and execute said fitness program by controlling the fitness apparatus.

13. The control device according to claim 12, wherein the control device is arranged to allow the computer device to connect to a database in order to download data regarding said at least one fitness program onto said computer device and/or in order to upload data to said database.

14. The control device according to claim 13, wherein the resistance characteristics are the resistance characteristics of at least one of the movable parts of said fitness apparatus.

15. The control device according to claim 12, wherein the resistance characteristics are the resistance characteristics of at least one of the movable parts of said fitness apparatus.

16. The control device according to claim 12, wherein the predefined different resistance characteristic values of the one or more sets of predefined different resistance characteristic values are predefined different resistance characteristic values as a function of time.

17. The control device according to claim 16, further comprising a computer device configured for storing data regarding said at least one fitness program and at least one further fitness program that includes one or more further sets of predefined different resistance characteristic values, wherein the control device is arranged for allowing the user to select said at least one further fitness program and execute said at least one further fitness program by controlling the fitness apparatus.

18. The control device according to claim 17, wherein the predefined different resistance characteristic values of the one or more further sets of predefined different resistance characteristic values are predefined different resistance characteristic values as a function of time.

19. The control device according to claim 12, further comprising a computer device configured for storing data regarding said at least one fitness program and at least one further fitness program that includes one or more further sets of predefined different resistance characteristic values, wherein the control device is arranged for allowing the user to select said at least one further fitness program and execute said at least one further fitness program by controlling the fitness apparatus.

20. The control device according to claim 19, wherein the predefined different resistance characteristic values of the one or more further sets of predefined different resistance characteristic values are predefined different resistance characteristic values as a function of time.

21. The control device according to claim 11, wherein the resistance characteristics are the resistance characteristics of at least one of the movable parts of said fitness apparatus.

22. The control device according to claim 1, wherein the control device is arranged for adjusting a ratio between the degree of physical exercise and the engine power of the engine of the transport apparatus.

23. A transport apparatus, comprising a control device comprising a fitness apparatus having a base part and at least one movable part movable with respect to the base part for enabling a user to perform a physical exercise, wherein the fitness apparatus comprises a flywheel rotatably connected to the base part, wherein the fitness apparatus is arranged for setting the flywheel into motion by at least one of the one or multiple movable parts, wherein the control device further comprises a sensor device for sensing a degree of physical exercise at least partly by sensing a degree of motion of the flywheel, and wherein the control device is arranged for controlling engine power of an engine of the transport apparatus at least partly based on the sensed degree of physical exercise at least partly sensed by sensing the degree of motion of the flywheel.

24. The transport apparatus according to claim 23, wherein the fitness apparatus is located adjacent a seat of said transport apparatus such that the user, while operating said transport apparatus, can perform the physical exercise on said fitness apparatus, thereby controlling the engine power of the engine of said transport apparatus at least partly by said physical exercise.

25. A method for controlling an engine driven transport apparatus, comprising the steps of:
    powering or driving the transport apparatus merely by one or multiple engines of said transport apparatus; and
    controlling engine power of said one or multiple engines of the engine driven transport apparatus at least partly based on a sensed degree of motion of a flywheel set into motion by physical exercise performed by an operator of said transport apparatus.

26. The method according to claim 25, wherein the physical exercise performed by the operator is performed on a fitness apparatus provided in said transport apparatus.

* * * * *